Dec. 28, 1926.  
W. FALK, JR  
SOFT DRINK PACKAGE  
Filed May 27, 1926  
1,612,107
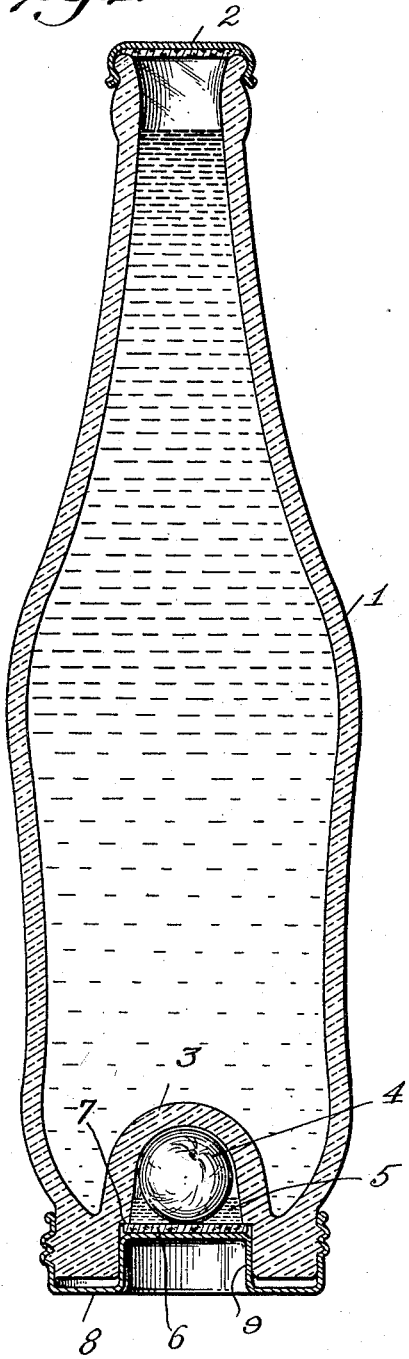
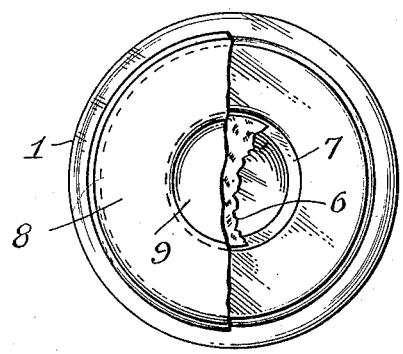
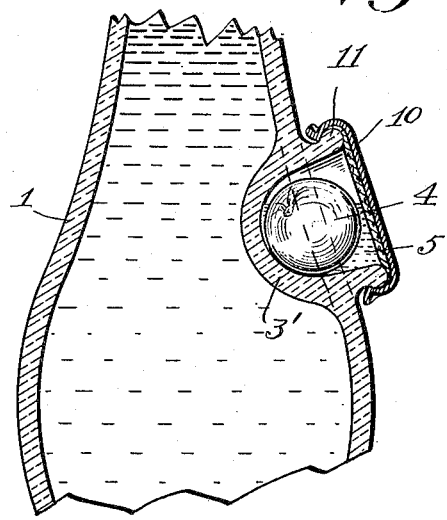
Inventor  
Washington Falk Jr.  
By Davis & Davis  
Attorneys Patented Dec. 28, 1926.

1,612,107

UNITED STATES PATENT OFFICE.

WASHINGTON FALK, JR., OF SAVANNAH, GEORGIA.

SOFT-DRINK PACKAGE.

Application filed May 27, 1926. Serial No. 112,032.

The object of this invention is to provide a soft drink in a retail bottle accompanied by a Maraschino cherry or other edible fruit which may be removed and placed in the drink at the time of consumption, as more fully hereinafter set forth.

Under present conditions, Maraschino cherries are put up in bottles in a preservative flavoring syrup or juice, and these cherries are removed one-by-one by the user and placed in the drink. The preservative syrup is necessary in order not only to preserve the fruit in prime condition, but also to insure its proper flavor and color. Therefore, the retailer of soft drinks in bottles must carry a stock of separate bottles of cherries in order that the cherries may be served in prime condition at the time of consumption. It is the object of my invention to combine the cherry-container, with its preservative syrup, with the soft-drink bottle, so that this combination drink may be sold and served in a single, original package, the construction being such that the cherry may be readily removed from its container and placed in the drinking glass before opening the bottle for pouring the soft drink.

In the drawing annexed, Fig. 1 represents a vertical sectional view of a soft-drink bottle embodying my invention in one of its forms; Fig. 2 is a bottom view thereof; and Fig. 3 is a view of a modification.

In the annexed drawing, I show two embodiments of my invention. In this drawing, Fig. 1, 1 designates the bottle, 2 the usual cap therefor, and 3 an upward bulge in the bottom of the bottle forming a cavity for the reception of the cherry 4 and the preservative syrup 5 therefor. The cherry-pocket is sealed by a disk 6 which fits up against a downwardly-facing shoulder 7 formed in the mouth of the cavity at a distance from the under surface of the bottom of the bottle. The sealing-disk 6 is held in sealing relation to the shoulder 7 by means of a metal cap 8 screwed on external threads formed on the bottom of the bottle and having a central boss 9 which fits up into the mouth of the cherry-cavity and presses against the disk. This construction may be varied without departing from my invention, it being possible to use other sealing devices so long as they are readily removable and it being also possible to locate the cherry-pocket at some other point in the bottle, as, for instance, in one side, as shown in Fig. 3.

My invention insures preservation of the cherry to the same degree to which it is preserved in the usual bottles in which it is stored in bulk. Should the cherry be placed in the soft-drink receptacle, it would not only lose its color and flavor, but it would give an undesirable tint and possible flavor to the contents of the bottle. With my invention, therefore, the contents of the bottle proper as well as the pocket or supplemental bottle are preserved in prime condition as long as it is possible to preserve such articles in bottles. This enables the bottles to be shipped and distributed just as soft drinks are now widely distributed throughout the country. An advantage of my package is that I may combine with the soft drink a cherry which is too large to pass through the neck of the bottle, these bottles being, as is well known, of standard size throughout the country and it being, therefore, impractical to make bottles having larger necks. Also, it will be understood that my invention may be used for bottling olive and other drinks where the fruit is too large to pass into the bottle through the neck or it is otherwise undesirable to place the fruit in the liquid contents of the bottle.

What I claim as new is:

1. An original liquid package consisting of a bottle containing a liquid drink and having an inwardly-extending pocket containing an edible fruit and its preservative liquid, the bottle having a closure device and said pocket also having an independent removable sealing and closing device.

2. A bottle having an upwardly-extending pocket in its bottom, this pocket being provided with an annular downwardly-facing shoulder located at a distance above the bottom, a metal cap screwed on the exterior of the bottom and having a central cup extending up into the pocket, and a washer clamped between the upper surface of the cup and said downwardly-facing shoulder.

In testimony whereof I hereunto affix my signature.

WASHINGTON FALK, JR.